Feb. 9, 1937.  E. WILDHABER  2,070,191
METHOD OF CUTTING GEARS
Filed Feb. 23, 1934   2 Sheets-Sheet 1

Inventor
Ernest Wildhaber
By
Buhlbinger
Attorney

Feb. 9, 1937. E. WILDHABER 2,070,191
METHOD OF CUTTING GEARS
Filed Feb. 23, 1934 2 Sheets-Sheet 2

Inventor
Ernest Wildhaber
By
B. Schlesinger
Attorney

Patented Feb. 9, 1937

2,070,191

UNITED STATES PATENT OFFICE 2,070,191

METHOD OF CUTTING GEARS

Ernest Wildhaber, Rochester, N. Y., assignor to Gleason Works, Rochester, N. Y., a corporation of New York Application February 23, 1934, Serial No. 712,478

18 Claims. (Cl. 90—5)

The present invention relates to the production of gears and particularly to the production of straight bevel gears.

Straight bevel gears are commonly cut in an intermittent indexing process, but for years efforts have been made to develop a hobbing process for cutting these gears on the theory that a hobbing process would be faster than an intermittent indexing process since the hobbing process would permit saving of the time which is required in the ordinary process for indexing. Heretofore, however, all attempts at hobbing straight bevel gears have failed, either because the tool was too complicated or because correct tooth profiles could not be generated or because of complications in the machine due to the number of motions of the tool required to produce correct lengthwise and profile tooth shapes. Heretofore the hobs have been made with blades or cutting teeth varying in shape and thickness to conform to the variation in shape and thickness of bevel gear teeth along their length and heretofore the hobs have had to have in addition to rotation, a feed across the face of the blank and sometimes an axial feed also. Even then, the hobs have not been capable of rolling out full tooth profiles.

The purpose of the present invention is to provide a method of hobbing straight bevel gears which will produce correct gears; in which a comparatively simple tool may be employed; and which can be practiced on a machine of very simple construction.

With the present invention, gears can be completely and accurately cut by simply rotating a hob in timed relation with a rotating gear blank and simultaneously effecting the necessary generating roll between hob and blank. No feed of the hob across the face of the blank is necessary. A hob of the scroll type is employed that has its cutting blades or teeth arranged in a spiral of cycloidal form. Such a hob, when rotated in proper timed relation with a rotating gear blank, will envelop a straight lengthwise tooth shape and can be used to represent a straight-toothed crown gear to generate correct profiles on a bevel gear blank. The cutting blades or teeth of this hob may be of straight profile and identical with one another and no variation in pressure angle or thickness between blades is required to produce correct profile shapes at different points along the length of the teeth of a bevel gear.

The principal objects of the invention have been described above. Other objects of the invention will be apparent hereinafter from the specification and from the recital of the appended claims.

Figure 6:
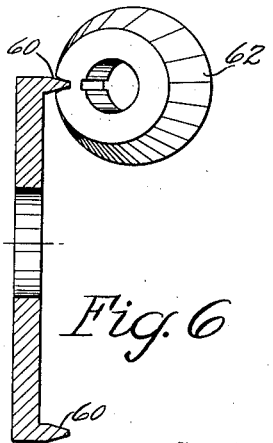
Figure 7:
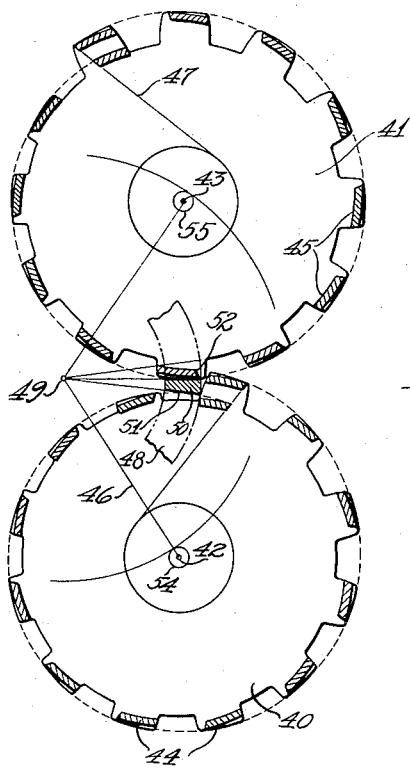
Figure 3:
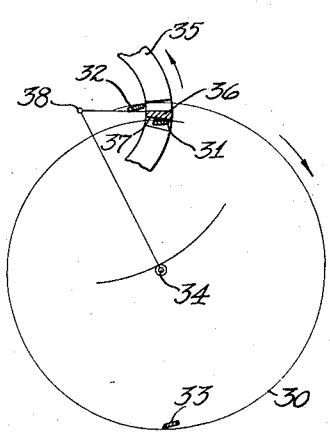
Figure 4:
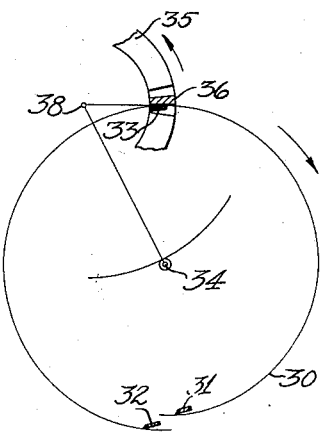
Figure 5:
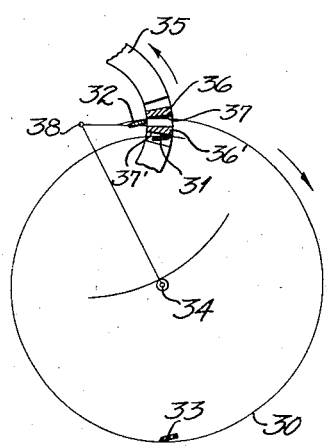

Figs. 3, 4, and 5 are diagrammatic views showing successive positions of hob and gear in cutting and illustrating how the hob envelops the whole length of a crown gear tooth surface in a single revolution;

Fig. 6 is a view of the hob and a bevel gear in operative relation, the hob being shown in section; and Fig. 7 is a diagrammatic plan view, showing the preferred method of practicing the present invention, in which a pair of interlocking hobs are employed to cut simultaneously opposite sides of the teeth of a gear.

Figure 1:
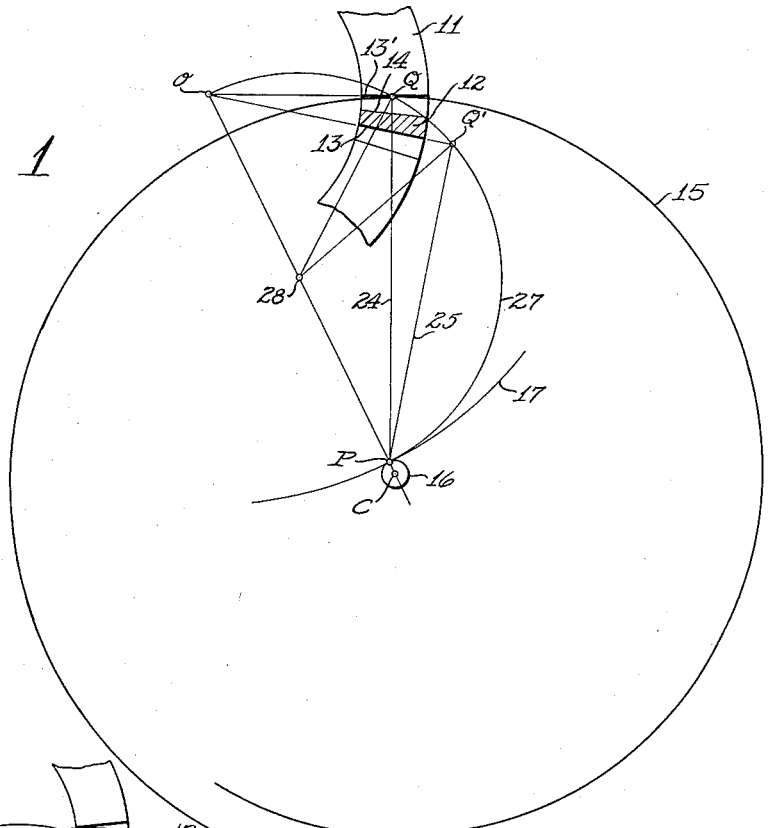
Fig. 1 is a diagrammatic plan view illustrating the principles on which the present invention is based and showing the relation between a hob constructed according to the present invention and a straight-toothed crown gear when hob and crown gear rotate in opposite directions.

In Fig. 1, O denotes the apex or center of a crown gear 11 having straight teeth 12 whose sides 13 and 14 are plane and intersect in the crown gear apex O. One tooth is shown in section and a side 13' of an adjacent tooth. The line 13' may also represent another position of the side 13 when the crown gear has rotated on its axis through the distance of one pitch.

We shall now determine the thread spiral 15 of a hob whose axis C is parallel to the axis O of the crown gear and which meshes with the teeth 12 of the crown gear.

Let $n$ be the number of threads or starts of the hob and N the number of teeth of the crown gear. N may be non-integral. The line O—C connecting the centers of hob and crown gear contains the pitch-point P or center of instantaneous relative motion between the hob and crown gear. Pitch-point P intersects the center line O—C so that $OP:PC=N:n$.

Through transformation:

$$PC = OC \cdot \frac{n}{N+n}$$

If as in Fig. 1, $$OP + PC = OC$$

In Fig. 1, the hob and crown gear turn in opposite directions in the manner of two circles 16 and 17 rolling externally on one another.

Figure 2:
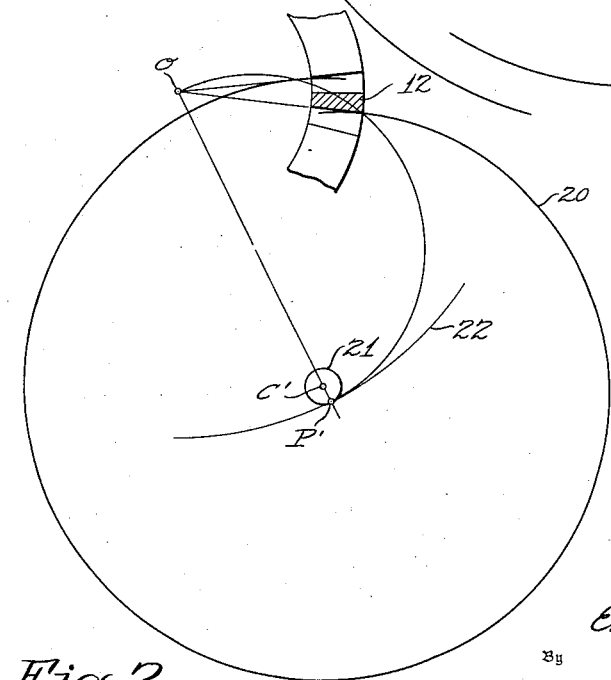
Fig. 2 is a similar view showing the relation existing between hob and crown gear when hob and gear rotate in the same direction.

In Fig. 2, the case has been illustrated where the hop and crown gear turn in the same directions. Here the spiral of the cutter is designated at 20 while the center of the cutter is designated at C'. The crown gear center is again designated at O and a tooth of the crown gear is shown in section at 12. Here, due to the relative directions of rotation of crown gear and hob, the hob and crown gear rotate together in the manner of a circle 21 rolling internally on the circle 22 and P' is the pitch point or center of instantaneous motion between the hob and crown gear. In this case $$OP' - PC' = OC' \text{ and } P'C' = OC' \cdot \frac{n}{N-n}$$

In either case, points of contact between the straight pitch line of the crown gear and the hob spiral 15 or 20 can be determined by drawing a normal to said pitch line from pitch point P or P'. So in Fig. 1, point of contact Q is found by drawing a line 24 from the pitch point P to the pitch line 13'. Likewise point Q' of contact between hob and crown gear, when hob and crown gear have rotated, respectively, to another position, can be determined by drawing line 25 normal to the line 13 which represents the new position that the pitch line 13' has assumed.

In the same way, other points of contact between crown gear and hob can be determined. The various points of contact Q, Q', etc. together trace the line of action between the straight pitch lines of the crown gear and the hob spiral. They are located on a semi-circle 27 whose center is on the line OP, namely at point 28 midway between O and P.

It can readily be demonstrated that the point of contact Q moves at a uniform rate on the circle 27 in direct proportion to the turning motion of the crown gear and of the hob. The hob spiral 15, is, moreover a cycloidal curve and can be considered as the relative path of a point Q of circle 27 which rolls on the hob circle 16. When the hob spiral is provided with a straight profile in any normal section, it will be seen that the hob spiral will, as it rotates, readily sweep out the whole length of the tooth surface of the crown gear from top to bottom thereof.

The spiral of the hob is not difficult to produce. It may be generated conjugate to the crown gear by using a plane-sided grinding wheel to represent a side of a tooth of the crown gear and rotating the hob-blank and grinding wheel on their respective axes, while producing an additional relative rotary motion between the wheel and hob-blank as though the hob were rotating in engagement with the crown gear. Another way to produce the hob spiral is to use a conical tool or grinding wheel and mount the tool or wheel on a slide which is moved radially of an axis representing the axis of the crown gear and at a uniform rate on the semi-circle 27 while the hob-blank is rotated at a uniform rate on its axis. Of course, the hob-blank will be gashed and relieved to provide cutting teeth.

The action of the hob in cutting is shown clearly in Figs. 3 to 5 inclusive. The hobbing cutter is designated by the spiral line 30. For the sake of clearness in illustration, only three blades of the cutter are shown, a first or entering blade 31, a final or leaving blade 32 and an intermediate blade 33. 34 designates the axis of the cutter. 35 designates a crown gear having straight teeth 36 and 38 denotes the axis and center of this crown gear.

I shall assume that the hob is to cut the side-surface 37 of the teeth 36 of the gear 35 and that the hob is rotating in a clockwise direction while the gear is rotating in a counter-clockwise direction. As the hob and blank rotate together, the first cut on the side 37 of the gear tooth is taken by the blade 31 which takes its cut at the outer end of the tooth. The blades of the cutter, which follow the blade 31, take other cuts along the tooth length, spaced from one another and from the cut taken by the blade 31. Thus, when the cutter and gear have rotated far enough on their respective axes to bring the blade 33 into operative position, this blade will take a cut midway the length of the tooth side 37 as shown in Fig. 4 and finally, when the cutter and gear have rotated far enough to bring the blade 32 into operative position, this blade will cut at the inner end of the tooth, finishing the tooth side 37.

While the blade 32 is taking the final cut at the inner end of one tooth, the blade 31 will take the initial cut at the outer end of the corresponding side 37' of the next adjacent tooth 36', as clearly shown in Fig. 5.

The blades of the hob in the present process, therefore, take enveloping cuts along the length of a tooth and by their successive action envelop the full length of the tooth-side.

When one side of all the teeth of a gear has been cut, the cutter and blank may be readjusted and the other side of the teeth finished. It is preferable, however, to use two cutters and finish both sides of the teeth simultaneously. This is illustrated in Fig. 7.

Here are shown a pair of cutters 40 and 41 which are of opposite hand and which rotate on axes 42 and 43, respectively. The blades of one cutter are designated at 44 and the blades of the other cutter at 45. Blades of both cutters may be sharpened non-radially as indicated by the lines 46 and 47, respectively, to provide outside cutting edges. 48 is the gear to be cut. 49 is its axis and 50 denotes one of its teeth. The cutter 40 cuts one side 51 of the teeth of the gear and the cutter 41 cuts the opposite side 52 of the gear teeth. The two hobs are turned in opposite directions and at the same speed while the crown gear rotates on its axis 49 at the inverse ratio of the number of teeth in the crown gear to the number of threads in each hob, in this case, one. Preferably the hob axes 42 and 43 are disposed at equal radial distances from the gear axis 49 and the hobs and crown gear rotate together as though the circles 54 and 55 of the two cutters were rolling externally and internally, respectively, on two circles 56 circumscribed about the crown gear axis 49.

The cutting teeth or blades of the hobs 40 and 41 can be easily relief-ground and sharpened on account of the large distance between adjacent teeth or blades.

In the preceding description, reference has been made to the cutting of a crown gear because the motions employed in producing such a gear are easiest to illustrate and describe and because the crown gear is the basic member of the system of bevel gears. Bevel gears can be produced, however, by simply imparting a relative swinging motion between the hob and blank as though the blank were rolling with the crown gear represented by the hob, while rotating the hob and gear blank together. This corresponds to the practice followed in generating bevel gears with other forms of cutting tools.

The hob has cutting edges of straight profile, as denoted, for instance at 60 in Fig. 6. As it rotates in engagement with the bevel gear 62, the hob sweeps out the lengthwise and profile shapes of the crown gear teeth so that when a relative rolling motion is produced between hob and blank as though the blank were rolling with a crown gear, tooth surfaces will be produced on the blank conjugate to those of the crown gear.

It will be understood, however, that the present invention is not restricted to the production of bevel gears conjugate to a crown gear as it may be employed, too, in the production of either a non-generated gear or a pinion conjugate to such a gear. The non-generated gear can be produced by feeding the hob into depth relative to the blank while rotating the hob and blank together and the mating pinion can be produced by rotating the hob and blank together while producing a relative rolling motion between hob and blank as though the blank were rolling with its mate gear.

The invention may be employed, too, in the cutting of spur gears. Here a straight line generating motion instead of a circular motion will be employed to generate spur gears conjugate to a rack instead of a crown gear, while for spur pinions conjugate to non-generated gears, the hob and blank will be rolled together as though the blank were rolling with its mate non-generated gear.

In general, it may be said that while the invention has been described in connection with certain embodiments thereof, the invention is capable of various further modifications and this application is intended to cover any variations, uses or adaptations of the invention following, in general, the principles of the invention and including such departures from the present disclosure as come within known or customary practice in the gear art and as may be applied to the essential features hereinbefore set forth and as fall within the scope of the invention and the limits of the appended claims.

Having thus described my invention, what I claim is:

1. The method of cutting the side tooth surfaces of straight-toothed gears which comprises bringing into engagement with a gear blank a cutter, whose cutting edges project from one side face of the cutter and are so arranged in a spiral that different blades will cut at different points along the length of a gear tooth surface and envelop together a straight surface, and rotating the cutter and blank together in timed relation while holding the cutter against movement lengthwise of the teeth of the blank.

2. The method of cutting the side tooth surfaces of straight-toothed bevel gears which comprises bringing into engagement with a tapered gear blank a cutter, whose cutting edges project from one side face of the cutter and are so arranged in a spiral that different blades will cut at different points along the length of a gear tooth surface and together envelop a straight surface as the cutter and blank rotate together, and rotating the cutter and blank together in timed relation while maintaining the axis of the cutter at a fixed distance from the apex of the blank.

3. The method of cutting the side tooth surfaces of straight-toothed bevel gears which comprises bringing into engagement with a tapered gear blank a cutter, whose cutting edges project from one side face of the cutter and are so arranged in a spiral that different blades will cut at different points along the length of a gear tooth surface and together envelop a straight surface as the cutter and blank rotate together, and rotating the cutter and blank together in timed relation while producing a relative swinging motion between the cutter and blank about the apex of the blank and maintaining a constant distance between the axis of the cutter and the apex of the blank.

4. The method of cutting the side tooth surfaces of straight-toothed gears which comprises bringing into engagement with a gear blank a cutter, whose cutting edges project from one side face of the cutter and are so arranged in a spiral that different blades will cut at different points along the length of a gear tooth surface and envelop together a straight surface, and rotating the cutter and blank together in timed relation while producing a relative rolling motion between the cutter and blank and holding the cutter against movement lengthwise of the teeth of the blank.

5. The method of cutting the side tooth surfaces of straight-toothed gears which comprises bringing a cutter, whose cutting edges project from one side face of the cutter and are arranged in a spiral of cycloidal form, into engagement with a gear blank, and rotating the cutter and blank together in timed relation while holding the cutter against movement lengthwise of the teeth of the blank.

6. The method of cutting the side tooth surfaces of straight-toothed bevel gears which comprises bringing a cutter, whose cutting edges project from one side face of the cutter and are arranged in a spiral of cycloidal form, into engagement with a gear blank, and rotating the cutter and blank together in timed relation while maintaining a constant distance between the axis of the cutter and the apex of the blank.

7. The method of cutting the side tooth surfaces of straight-toothed gears which comprises bringing a cutter, whose cutting edges project from one side face of the cutter and are arranged in a spiral of cycloidal form, into engagement with a gear blank, and rotating the cutter and blank together in timed relation while producing a relative rolling motion between cutter and blank and holding the cutter against movement lengthwise of the teeth of the blank.

8. The method of cutting the side tooth surfaces of straight-toothed bevel gears which comprises bringing a cutter, whose cutting edges project from one side face of the cutter and are arranged in a spiral of cycloidal form, into engagement with a tapered gear blank, and rotating the cutter and blank together in timed relation while producing a relative rolling motion between the cutter and blank and maintaining the cutter at a fixed distance from the apex of the blank.

9. The method of cutting the side tooth surfaces of straight-toothed bevel gears which comprises bringing into engagement with a tapered gear blank a cutter, having a plurality of straight cutting edges projecting from one side face of the cutter and equally inclined to the axis of the cutter and so arranged in a spiral that successive blades cut at successive points along the length of a tooth and together envelope a straight tooth surface as the cutter and blank rotate together, and rotating the cutter and blank together in timed relation while maintaining the axis of the cutter at a fixed distance from the apex of the blank.

10. The method of cutting the side tooth surfaces of straight-toothed bevel gears which comprises bringing into engagement with a tapered gear blank cutter, having a plurality of straight cutting edges projecting from one side face of the cutter and equally inclined to the axis of the cutter and so arranged in a spiral that successive blades cut at successive points along the length of a tooth and together envelope a straight tooth surface as the cutter and blank rotate together, and rotating the cutter and blank together in timed relation, and producing a relative rolling movement between the blank and cutter about an axis parallel to the axis of the cutter while maintaining the axis of the cutter at a fixed distance from the apex of the blank.

11. The method of cutting the side tooth surfaces of straight-toothed bevel gears which comprises employing a cutter, whose cutting edges project from one side face of the cutter and are arranged in a spiral of cycloidal form, rotating the cutter and a tapered gear blank in engagement in timed relation, and simultaneously producing a relative swinging movement between the cutter and blank about an axis parallel to the axis of the cutter and offset a constant distance from the axis of the cutter.

12. The method of cutting straight-toothed gears which comprises employing a pair of cutters, whose cutting edges project from their side faces and are arranged, respectively, in spirals of cycloidal form but of opposite hand, engaging said cutters with a gear blank, rotating the cutters in opposite directions in engagement with the blank while rotating the blank on its axis and simultaneously producing a relative swinging motion between the cutters and blank about an axis parallel to the axes of the cutters and offset a constant distance from the axes of the cutters.

13. The method of cutting straight-toothed gears which comprises employing a pair of cutters, whose cutting blades project from their side faces and are arranged, respectively, in spirals of cycloidal form but of opposite hand and are so spaced apart that the blades of one cutter have an interlocking engagement with the blades of the other cutter when the two cutters are rotated, rotating said cutters in opposite directions in timed relation with a rotating gear blank and simultaneously producing a relative swinging motion between the cutters and blank about an axis parallel to the axes of the cutters and offset from the axes of the cutters.

14. The method of cutting straight toothed gears which comprises employing a pair of cutters each of which has a plurality of spirally arranged cutting edges that are adapted together to envelope a straight tooth surface, engaging said cutters with opposite side tooth surfaces of a gear blank and rotating the cutters in engagement with the blank while rotating the blank on its axis and maintaining the cutters against movement longitudinally of the gear tooth surfaces.

15. The method of cutting straight toothed gears which comprises employing a pair of cutters each of which has a plurality of spirally arranged cutting edges that are adapted together to envelope a straight tooth surface, engaging said cutters with opposite side tooth surfaces, respectively, of a gear blank and rotating the cutters in opposite directions while rotating the blank on its axis and maintaining the cutters fixed against movement lengthwise of the teeth of the gear.

16. The method of cutting straight toothed gears which comprises employing a pair of cutters each of which has a plurality of identical spirally arranged cutting teeth having cutting edges which are identically inclined to the axis of the cutter and which are so arranged that together they envelope a straight tooth surface, engaging said cutters with opposite side tooth surfaces of a gear blank and rotating the cutters in opposite directions in engagement with the blank while rotating the blank on its axis and maintaining the cutters against movement longitudinally of the tooth surfaces upon which they are operating.

17. The method of cutting a gear which comprises employing a pair of cutters each of which has a plurality of spirally arranged cutting edges which are so arranged that together they envelope the lengthwise shape of a tooth surface of the gear and one of which has cutting edges for cutting one side tooth surface of the gear and the other of which has cutting edges for cutting the opposite side tooth surface of the gear, engaging said cutters with opposite sides of a tooth of the blank and rotating the cutters in engagement with the blank while rotating the blank on its axis and maintaining the cutters against longitudinal movement relative to the tooth surfaces upon which they are operating.

18. The method of cutting a gear which comprises employing a pair of cutters each of which has a plurality of spirally arranged cutting edges which are so arranged that together they envelope the lengthwise shape of a tooth surface of the gear, positioning said cutters in engagement with the blank so that the axes of the cutters lie on opposite sides of a tooth of the blank and the cutting edges of the cutters operate, respectively, on opposite sides of the tooth and rotating the cutters in opposite directions in engagement with the blank while rotating the blank on its axis and maintaining the cutters against longitudinal movement relative to the tooth surfaces upon which they are operating.

ERNEST WILDHABER.